United States Patent [19]
Schad

[11] Patent Number: 5,922,372
[45] Date of Patent: *Jul. 13, 1999

[54] HIGH SPEED LOCKING CLAMP

[75] Inventor: Robert D. Schad, Toronto, Canada

[73] Assignee: Husky Injection Molding Systems Ltd., Canada

[*] Notice: This patent is subject to a terminal disclaimer.

[21] Appl. No.: 08/997,314

[22] Filed: Dec. 23, 1997

Related U.S. Application Data

[63] Continuation-in-part of application No. 08/743,719, Nov. 6, 1996, abandoned.

[30] Foreign Application Priority Data

Oct. 29, 1997 [WO] WIPO ............... PCT/US97/19507

[51] Int. Cl.⁶ ................................................. B29C 45/64
[52] U.S. Cl. ..................................... 425/595; 425/451.9
[58] Field of Search ............................. 425/589, 595, 425/450.1, 451.9

[56] References Cited

U.S. PATENT DOCUMENTS

| | | | |
|---|---|---|---|
| 3,751,203 | 8/1973 | Hehl | 425/595 |
| 4,832,884 | 5/1989 | Speck et al. | 264/40.5 |
| 4,966,738 | 10/1990 | Inaba et al. | 264/40.5 |
| 5,133,655 | 7/1992 | Schad et al. | 425/150 |
| 5,147,661 | 9/1992 | Kurumaji et al. | 425/150 |
| 5,194,267 | 3/1993 | Funakoshi et al. | 425/47 |
| 5,302,109 | 4/1994 | Glaesener et al. | 425/595 |
| 5,338,171 | 8/1994 | Hayakawa et al. | 425/138 |
| 5,368,463 | 11/1994 | Kassner et al. | 425/595 |
| 5,370,518 | 12/1994 | Sasaki et al. | 425/147 |
| 5,620,723 | 4/1997 | Glaesener et al. | 425/589 |

FOREIGN PATENT DOCUMENTS 61-261017  11/1986  Japan.

*Primary Examiner*—James P. Mackey
*Attorney, Agent, or Firm*—Bachman & LaPointe, P.C.

[57] ABSTRACT

A securing/clamping system for use with platens of a molding machine including a stationary platen having a first mold half affixed thereto, a movable platen having a second mold half affixed thereto, the movable platen travelling along a plurality of tiebars, and reciprocatively moving between a mold open and mold closed position, and a system for applying a clamping force to the movable platen.

16 Claims, 6 Drawing Sheets

HIGH SPEED LOCKING CLAMP

CROSS-REFERENCE TO RELATED APPLICATION

This application is a Continuation-In-Part of U.S. patent application Ser. No. 08/743,719, filed Nov. 6, 1996 now abandoned.

BACKGROUND OF THE INVENTION

The present invention relates to a securing/clamping system for use with platens of a molding machine, especially an injection molding machine.

The prior art includes many injection molding machines which use tie bar clamping units for positioning a platen for the application of clamp-up forces. Control systems using hydraulic fluid, pressurized air and electric motors in combination with numerous switches and typically a controller unit are used to control both the positioning of the platens and the application and removal of clamp-up force for acquiring mold clamp-up and mold break.

Japanese Patent 61261-017 discloses a clamping mechanism for injection molding machines. The purpose of the control system therein is to maintain a parallel parting line between the molds by sensing the distance traveled by each clamping cylinder of each tie bar and maintaining the distances substantially equal. Accordingly, parallelism of the parting line between the molds can be maintained when the injection pressure of molten resin is uneven within the mold.

U.S. Pat. No. 4,832,884 to Speck et al. discloses a method for measuring and controlling the closing force of a plastic injection molding machine. Accordingly, for an injection molding machine, a closing force is measured for a predetermined number of operation cycles. A mean value is calculated from the measurements and if the mean value is within a predetermined tolerance, no control intervention takes place. However, if the mean value is outside the tolerance but within a zone limited by alarm units, control intervention takes place by stepwise changing the installed height of the mold until the actual value measured for closing force after each operating cycle is within the tolerance given. In this method and system, a toggle joint system serves to generate the closing force on the first and second mold parts. In this case, the force is measured and if the force is within a tolerance zone, the spacing between the first and second mold parts is altered to less than or no increase relative the old force.

U.S. Pat. No. 4,966,738 to Inaba et al. discloses a method for mold clamping force adjustment. Accordingly, in this method, a mold touch position is detected, at which the mold halves of a mold contact each other. The mold temperature is detected by means of thermocouples attached to the mold halves. The mold thickness is obtained based on the position where a movable platen and a stationary platen of the injection molding machine contact each other. After a molding operation is started, the mold temperature is detected and the amount of change in mold thickness during a period between a preceding cycle and a current cycle is calculated based on the change of mold temperature, the mold thickness, and the thermal expansion coefficient of the mold. A mold touch position for a current cycle is obtained based on the calculated value. Accordingly, when the mold is clamped in the current cycle, the movable platen is moved from the mold touch position toward the stationary platen by a predetermined amount to produce a predetermined mold clamping force. For this method, the measurements and adjustments are directed primarily to the mold position and not to the position of the clamping units. A clamping unit is a singular one which functions to force the movable platen against the stationary platen. That is, no tie bar clamping units are used internal to any of the platens for producing the clamp-up force.

U.S. Pat. No. 5,147,661 to Kurumaji et al. discloses a mold aligning device for a compression molding machine. The mold aligning device includes a plurality of mold position adjusting cylinder actuators disposed on a bed wherein position detectors are associated with the mold positioning adjusting cylinder actuators to detect the strokes thereof. The hydraulic source for driving the mold position adjusting cylinder actuators and control unit for controlling the strokes of the piston rods of the actuators with reference to zero points of the piston rods of the actuators, is determined beforehand. The zero points are decided by placing the upper mold in close contact with the lower mold and extending the piston rods of the actuators so that the piston rods are pressed against the lower surface of a slide block. The strokes of the piston rods are controlled during a compression-molding operation so that the upper mold is maintained precisely in parallel with the lower mold. This device is directed to pressure molding. The cylinder actuators are not positioned within a movable molten platen, and the actuators do not clamp onto tie bars. The main purpose of the machine is to maintain parallelism between the upper and lower molds by the actuators placing direct pressure on the upper mold supporting surface for maintaining the same parallel to the lower mold.

U.S. Pat. No. 5,338,171 to Hayakawa et al. discloses a die-clamping apparatus with an aligning device. The apparatus includes a stationary die plate for holding a stationary die, a movable die plate for holding a movable die, a hydraulic cylinder for moving the movable die plate forwardly and rearwardly with respect to the stationary die plate, and a tie bar for clamping by a fastening device located in the movable die plate. One or more alignment devices are provided so as to join the movable die and the stationary die in such a manner that primary alignment can be performed. The molding apparatus can be provided with a guide pin for secondarily aligning the movable die with respect to the stationary die when the stationary die and the movable die have been placed at predetermined positions. Four die clamping cylinders are provided at the corners of the stationary die plate so as to apply a clamping force to the stationary and movable dies after the fastening device has fastened to the tie bar. For this device, the tie bar fastener and clamping units, while being located on the tie bars, one adjacent the movable platen and one adjacent the stationary platen, are separate devices adding to the complexity of the machine.

U.S. Pat. No. 5,370,518 to Sasaki et al. discloses an apparatus for injection and compression molding. The apparatus includes and injection device and a compression molding device wherein the compression molding device includes a stationary die plate for holding a stationary die, a movable die plate for holding a movable die, means for rapidly extending and retracting the movable die plate relative to the stationary die plate and means for locking the movable die plate to the tie bars at a position where the movable die plate approaches the stationary die plate. Means for fastening the dies after the movable die plate is locked to the tie bars is also provided. An injection device for feeding a molten plastic material into a mold cavity between the stationary die and the movable die initiates feeding of the molten plastic material into the mold cavity when the stationary die and movable die are parted from each other by a predetermined distance. The plastic material is compressed and drawn while the movable die is moved towards the stationary die after a predetermined quantity of molten plastic material has been fed into the mold cavity. The apparatus includes a device in a movable die plate for clamping onto the tie bars. However, the device does not include a combined means for providing the clamping force between the platens and fastening to the tie bars, as the clamp force is provided by separate die fastening cylinders which are positioned on the tie bars but separate from the fasteners.

U.S. Pat. No. 5,133,655 to Schad et al. shows a clamp mechanism for an injection molding machine in which four columns attached to the moving platen are individually gripped by fluid actuated cylinders which also act as clamp force pistons. While this design is effective, it requires very close tolerances to be maintained between the columns and the inner bores of the cylinders since the amount of deflection of the cylinder walls to achieve sufficient gripping on the columns is small. Thus, manufacturing this clamp is expensive and in operation maintaining these small clearances imposes costly maintenance procedures.

Copending U.S. patent applications Ser. Nos. 08/482,869, 08/482,870 and 08/486,600 to Glaesener now U.S. Pat. No. 5,624,695, 5,645,875 & 5,620,723, respectively, show a novel lock nut arrangement for engaging the tiebars of a two platen injection molding machine clamp, for example. The locking nuts also act as clamp force pistons acting on the tiebars to clamp the mold between the platens.

It is an object of the present invention to provide a fast acting, energy efficient injection molding machine clamp assembly.

It is a still further object of the present invention to provide an injection molding machine clamp assembly with low construction cost, low maintenance and good reliability.

It is a still further object of the present invention to provide an injection molding machine clamp assembly which occupies less floor space than conventional designs.

Further objects and advantages of the present invention will appear hereinbelow.

SUMMARY OF THE INVENTION

In accordance with the present invention, the foregoing objects and advantages are readily obtained.

The present invention provides a securing/clamping system for use with platens of a molding machine, especially an injection molding machine. The system of the present invention includes a stationary platen having a first mold half affixed thereto and a movable platen having a second mold half affixed thereto, with the movable platen travelling along a plurality of tiebars. Means are provided for reciprocatingly moving the movable platen between a mold open and a mold closed position. The present invention includes means for applying a clamping force to the movable platen in the mold closed position comprising at least one and preferably a plurality of columns having a first end affixed to the movable platen and a second end spaced from the movable platen with a plurality of spaced teeth on the second end, a clamp piston adjacent the second end of the column, and lock means as lock nuts engaging the clamp piston operative to engage and disengage the circumferentially spaced teeth.

Further features of the present invention will appear hereinbelow.

BRIEF DESCRIPTION OF THE DRAWINGS

The present invention will be more readily understood from a consideration of the following illustrative drawings, wherein.

DETAILED DESCRIPTION OF PREFERRED EMBODIMENTS

Figure 1:
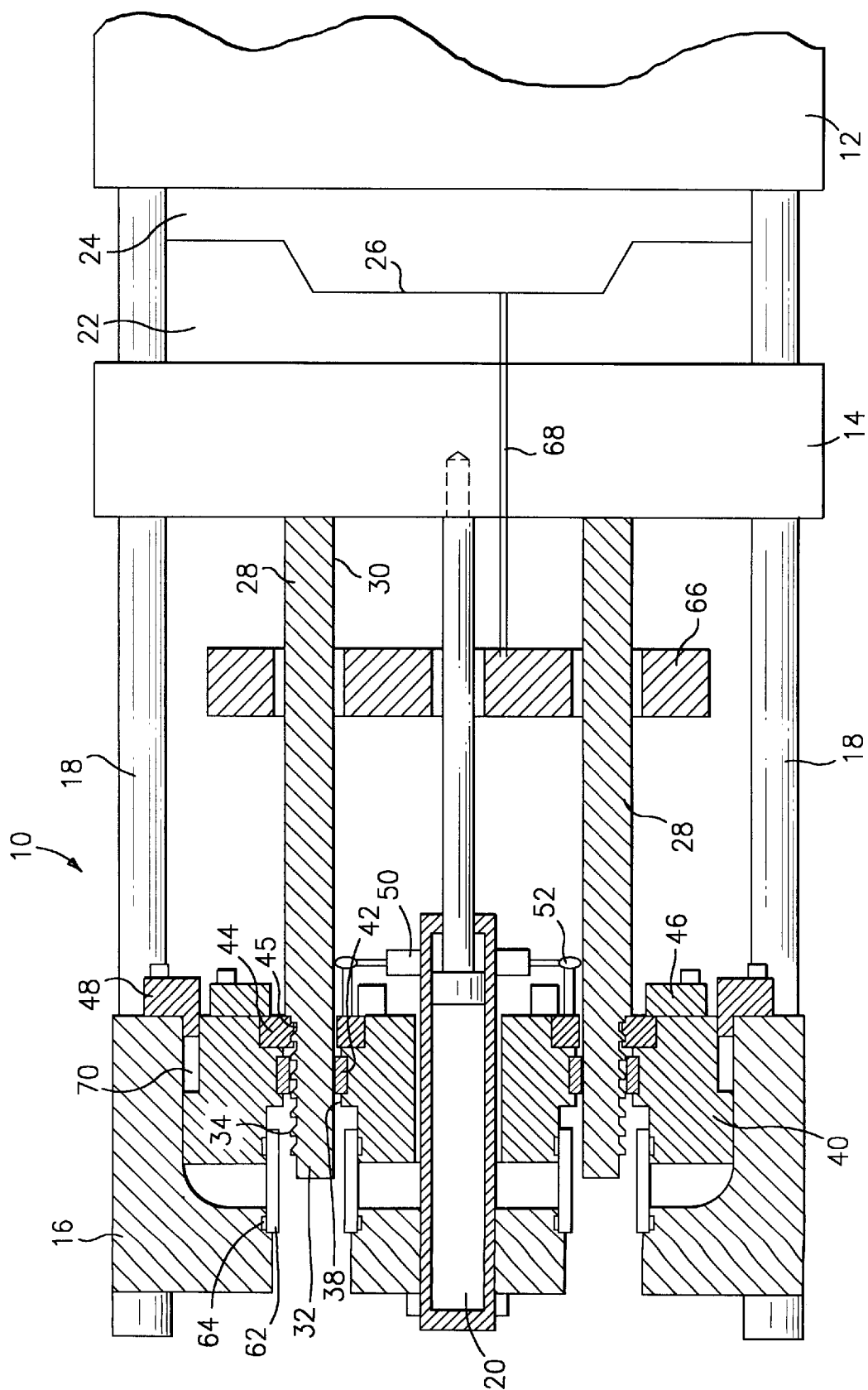
FIG. 1 is a section view of a clamp mechanism of the present invention.

Referring to FIG. 1, there is shown a high speed clamp mechanism 10 for an injection molding machine including a fixed platen 12, a movable platen 14 and a clamp block 16. Tiebars 18 connect fixed platen 12 and clamp block 16 while supporting the movable platen 14 which is free to slide along the tiebars. Generally four of the tiebars are used with only two being shown in FIG. 1. Moving platen 14 is moved from a mold closed position shown in FIG. 1 to a mold open position by cylinders 20 which may be supported by clamp block 16. One cylinder 20 is shown in FIG. 1, but of course two or more of the cylinders may be used depending on requirements. The cylinders are actuated by a suitable motive means, not shown.

First mold half 22, such as a cavity half, is affixed to movable platen 14, and second mold half 24, such as a core half, is affixed to fixed platen 12, with the mold halves together forming mold 26 in the mold closed position. As indicated above, movable platen 14 moves on tiebars 18 between a mold open and mold closed position. Only one mold 26 is shown in FIG. 1 for simplicity, but naturally a plurality of the molds can readily be provided.

Attached to the back side of movable platen 14, i.e., the movable platen side opposed to mold 26, is at least one column 28, generally a plurality of columns and preferably four columns, with two of the columns shown in FIG. 1. Columns 28 have a first end 30 affixed to movable platen 14 and a second end 32 spaced from the movable platen. A plurality of teeth 34 are provided on second end 32. Circumferentially spaced between teeth 34 is at least one axial groove 36 and generally three or more of said grooves as clearly shown in FIG. 3. Columns 28 pass through corresponding holes 38 in clamp piston 40, with the clamp piston 40 housed in clamp block 16 as shown in FIG. 1. Bearing 42 in clamp piston 40 support the columns in holes 38.

Figure 2:
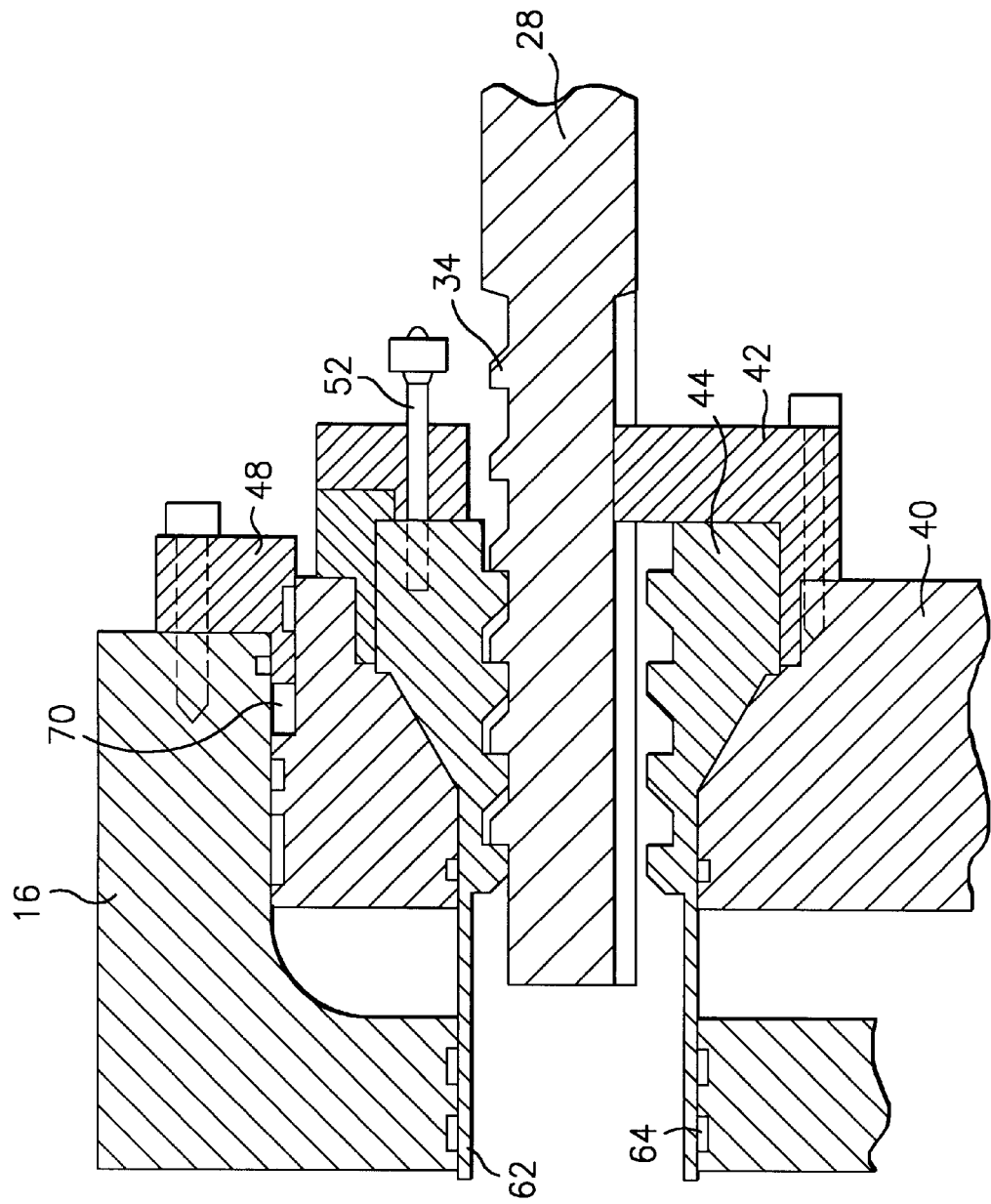
FIG. 2 is a detailed section view of a locking nut of the present invention.
Figure 3:
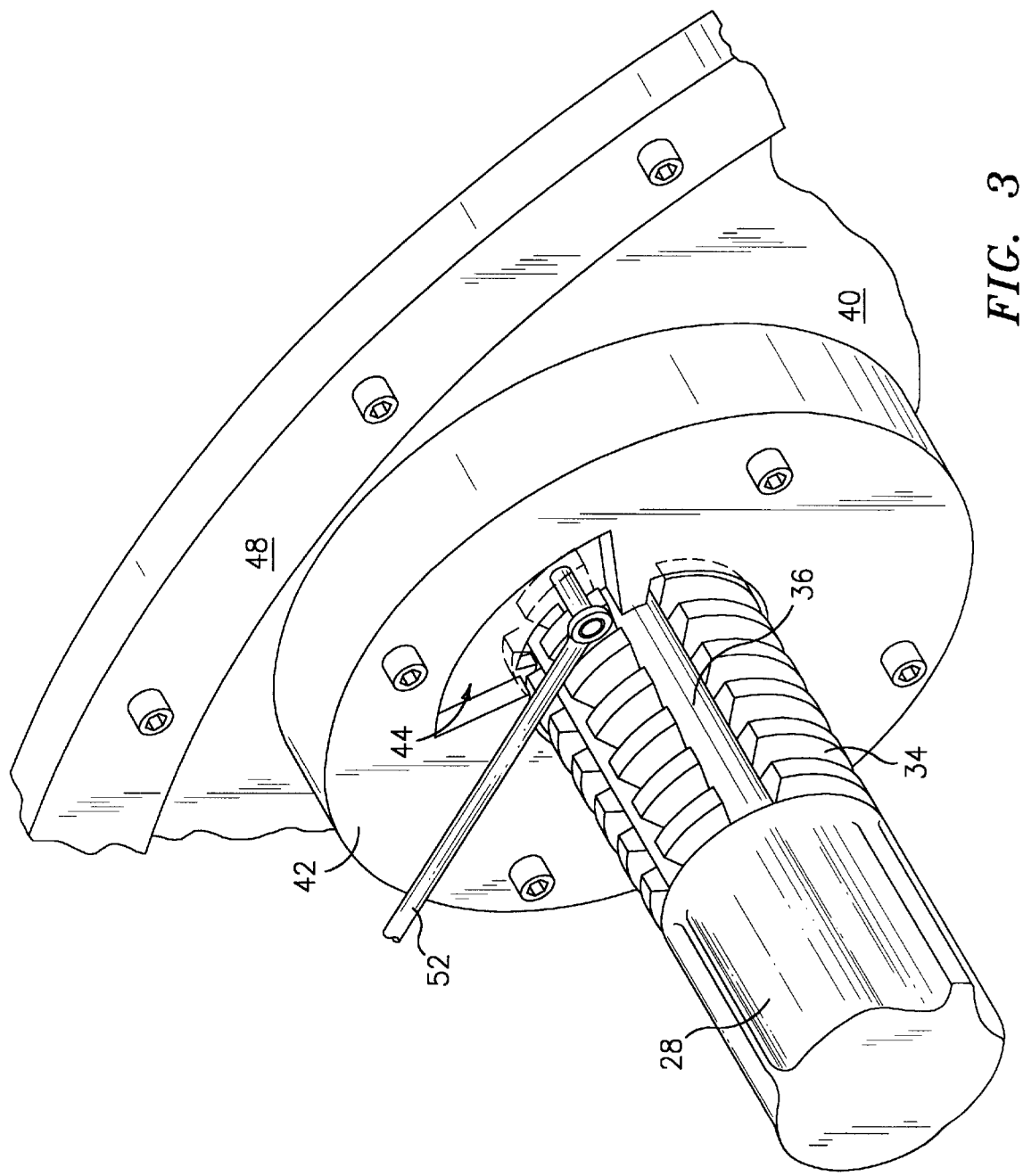
FIG. 3 is a perspective view of a locking nut and bearing assembly of the present invention.
Figure 4:
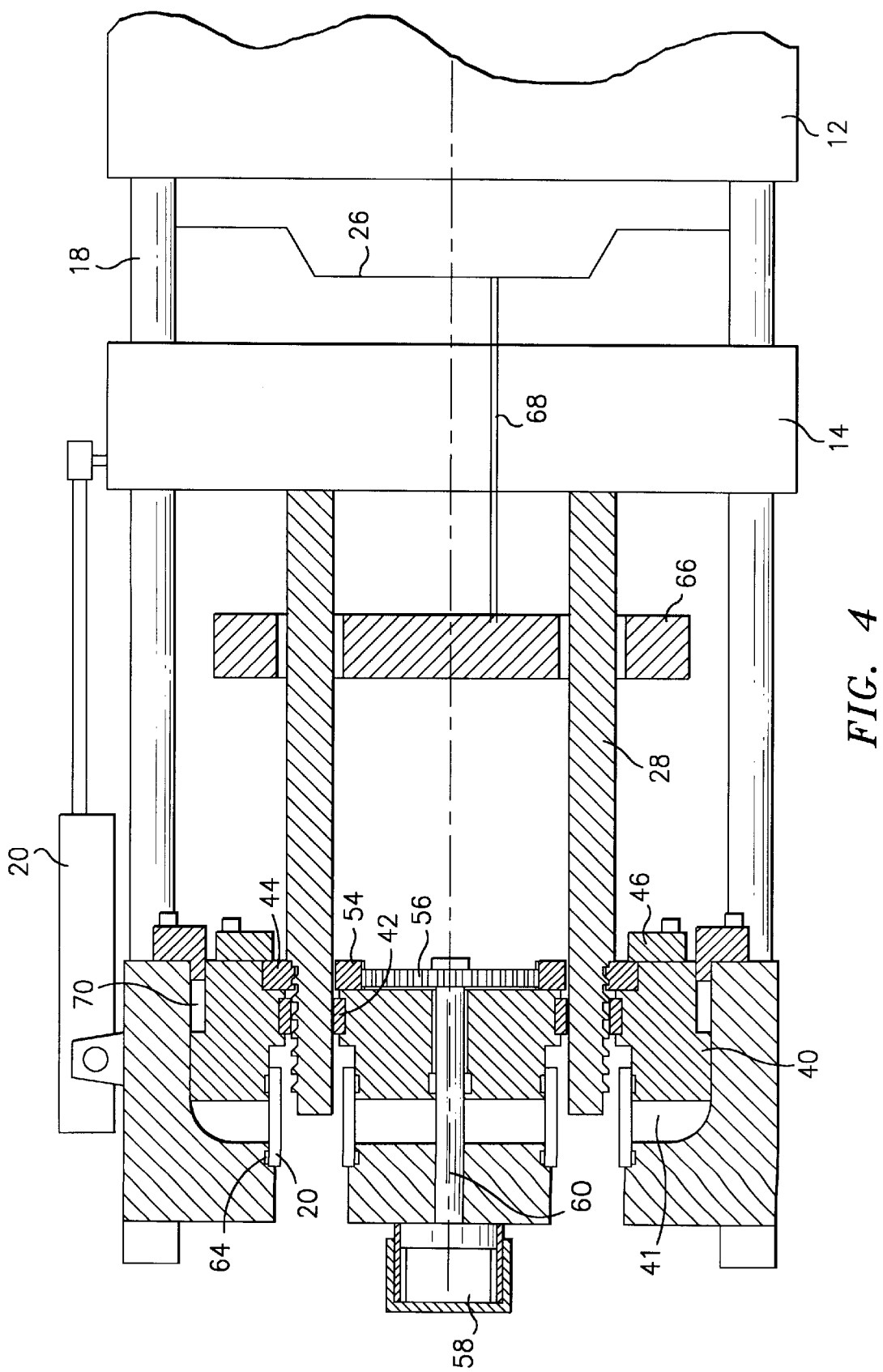
FIG. 4 is a section view of an alternate embodiment of a clamp mechanism of the present invention.
Figure 5:
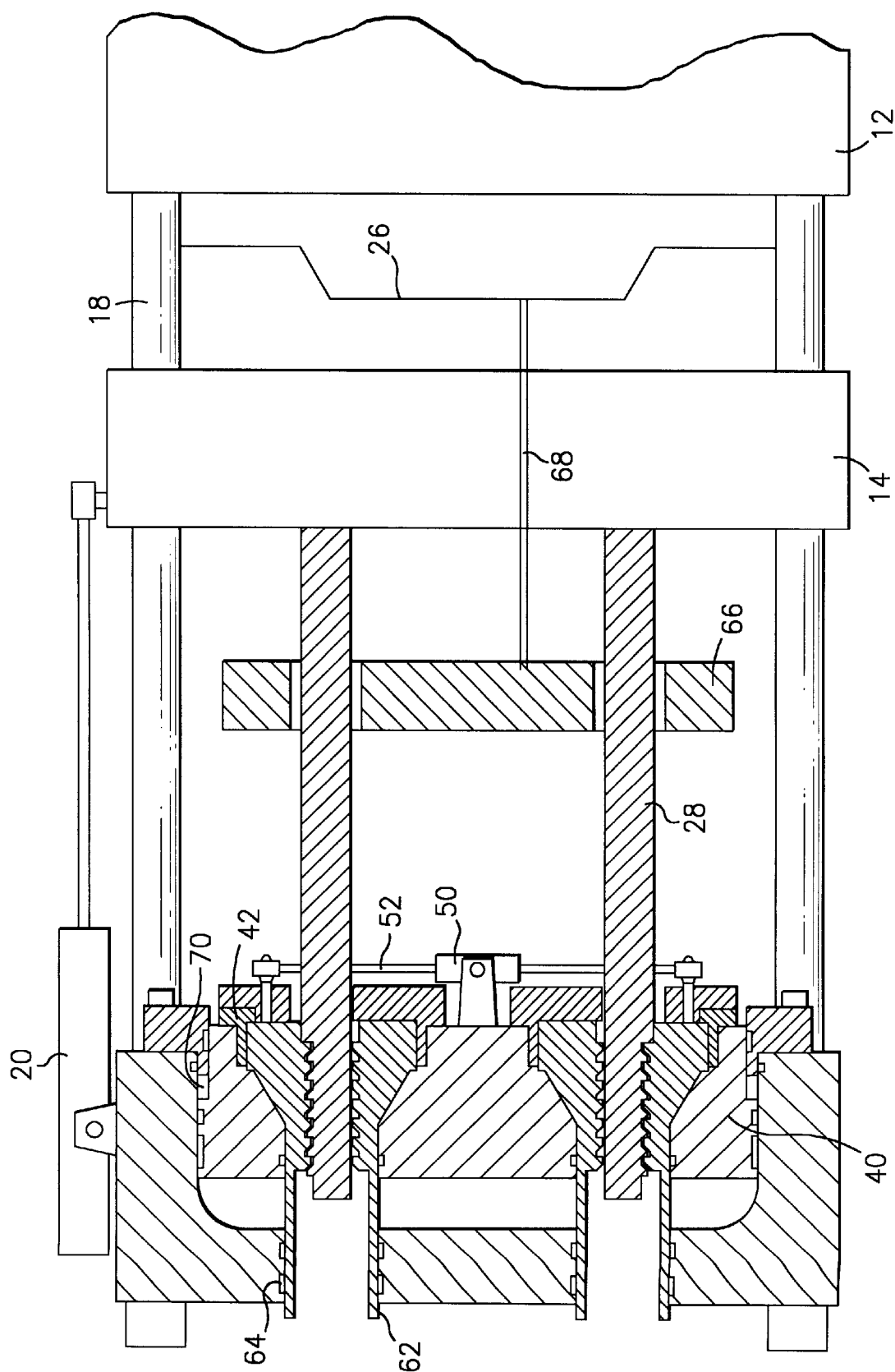
FIG. 5 is a section view of an additional alternate embodiment of a clamp mechanism of the present invention.

Lock nuts 44 mounted on or with clamp piston 40 and carrying lock nut teeth 45 are rotatable to engage or disengage teeth 34 on column 28. The lock nuts may be any desired locking means and engage clamp piston 40 or are retained inside or on a face of clamp piston 40, as by bearings 42 as shown in FIGS. 2, 3 and 5, or by retaining caps 46 as shown in FIGS. 1 and 4. Clamp piston 40 is retained inside clamp block 16 by front cap 48 or other desired retaining means. Lock nuts 44 are caused to rotate by cylinder 50 via linkage 52. In an alternate embodiment shown in FIG. 4, lock nuts 44 have gear teeth 54 cut in their external perimeter and these are engaged by a central gear 56 which is driven by motor 58 via drive shaft 60 that passes through clamp piston 40. The shaft 60 is splined so that it can move axially with respect to motor 58 when the clamp piston 40 carrying gear 56 moves within clamp block 16.

Sleeves 62, which can be an integral part of lock nut 44 as shown in FIGS. 2 and 5, or separate pieces as shown in FIGS. 1 and 4, use seals 64 to prevent fluid in the clamp cylinder from escaping during operation.

Ejector plate 66 carry ejector pins 68, is mounted on columns 28 to eject molded articles from mold 26 in a conventional manner.

In operation, movable platen 14 carrying first mold half 22 is moved to the mold closed position shown in FIG. 1 to form mold 26 by cylinder(s) 20. Lock nuts 44 are rotated so that lock nut teeth 45 engage column teeth 34. High pressure fluid is directed into clamp cylinder 14 to cause clamp piston 40 to press against lock nuts 44 and thereby against columns 28. This action clamps mold 26 between fixed platen 12 and movable platen 14. After injection and cooling of the plastic is complete the clamp is opened by first directing pressurized fluid against the "mold break" side of clamp piston 40 into cavity 70. This causes clamp piston 40 to pull lock nuts 44 away from the movable platen 14, they act on the back side of teeth 34 on column 28 and cause mold 26 to be forced open a short distance. Next, the lock nuts 44 are rotated out of engagement with columns 28, and cylinders 20 complete the opening of the mold. The molded parts are ejected from the mold 26 in a conventional manner and the clamp is ready to repeat the cycle.

Figure 6:
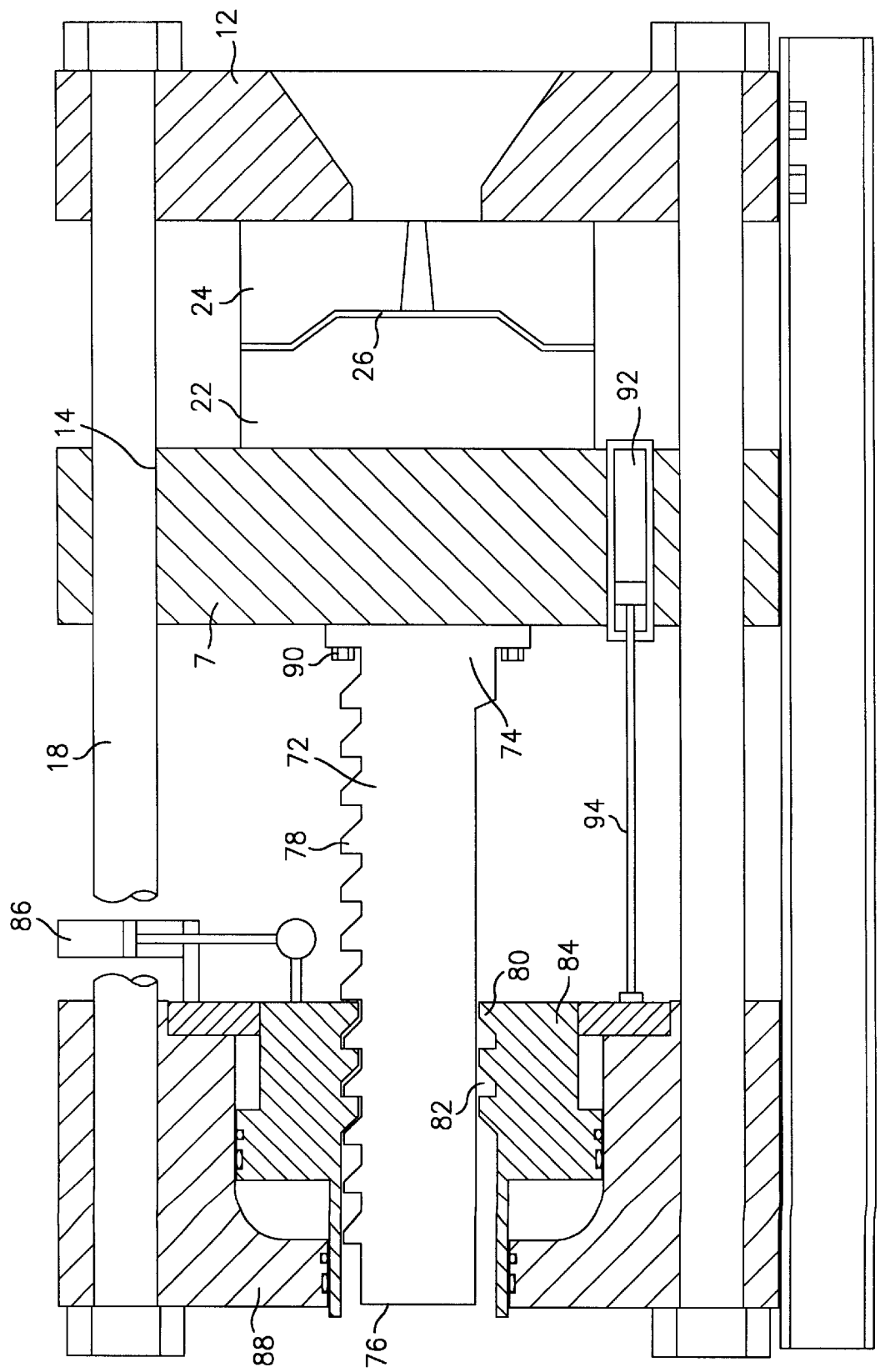
FIG. 6 is a section view showing an alternate embodiment of a clamp mechanism of the present invention.

The alternate embodiment of FIG. 6 shows a single column 72 having a first end 74 affixed to movable platen 14 and a second end 76 spaced from the movable platen. Column 72 is provided with a plurality of teeth 78 adjacent second end 76 which may be along the length of column 72 as shown in FIG. 6. Teeth 78 engage corresponding teeth 80 in bore 82 through single clamp piston 84 in locked relationship as shown in FIG. 6. Clamp piston 84 is rotated to engage/disengage teeth 78 and 80 by cylinder 86 which may be mounted onto clamp block 88. Teeth 78 on column 72 are interrupted by slots as shown in the other embodiments, see slots 36 in FIG. 3, so that in the disengaged position the teeth 80 in piston 84 are cleared in the slot permitting column 72 to move freely through bore 82 in piston 84. Column 72 is fixed to the back of movable platen 14, as by bolts 90, which is moved to open and close by cylinders 92 (one shown in FIG. 6). Cylinder 92 is mounted to moving platen 14 and its rod 94 is mounted to clamp block 88. Alternatively, the cylinder may be mounted to the clamp block and the rod to the moving platen. The operation of the embodiment of FIG. 6 is essentially as the previous embodiments. An advantage of the embodiment of FIG. 6 is its reduced cost and greater simplicity and hence greater reliability.

The design of the clamping system of the present invention uses very little pressurized fluid to cause its motions for securing and clamping and consequently is a very energy efficient and fast acting clamp system.

The simplicity of the system of the present invention has the advantages of low construction cost, less maintenance and good operating reliability when compared to conventional systems. When compared to a conventional column blocking style of clamp design, the present design is smaller, lighter and less costly components are mounted on the clamp piston face. Also, the distance between the back face of the moving platen and the front face of the clamp block can be reduced without reducing platen opening stroke because the shutter plate assembly has been eliminated. Thus, the overall build length of the present clamp system is shorter and thereby reduces the footprint of the clamp which reduces the required floor space in the operating plant.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A securing/clamping system for use with platens of a molding machine, which comprises:
   a stationary platen having a first mold half affixed thereto;
   a movable platen having a second mold half affixed thereto, said movable platen travelling along a plurality of tiebars;
   means for reciprocatingly moving said movable platen between a mold open and a mold closed position;
   means for applying a clamping force to said movable platen in the mold closed position comprising at least one column having a first end affixed to the movable platen and a second end spaced from the movable platen, with a plurality of circumferentially spaced teeth on said second end, a clamp piston adjacent the second end of the column, and lock means engaging the clamp piston operative to engage and disengage the circumferentially spaced teeth, wherein in the clamped position the clamp piston presses against the lock means which in turn presses against said column.

2. The system of claim 1, including a clamp block connected to the fixed platen on said tiebars, with the moving platen positioned between the stationary platen and clamp block.

3. The system of claim 2, including a plurality of said columns.

4. The system of claim 3, wherein said clamp piston is housed in said clamp block, and wherein each of said columns pass through corresponding holes in the clamp piston.

5. The system of claim 4, wherein each of said columns includes at least one axial groove circumferentially spaced between the teeth.

6. The system of claim 5, including at least three of said axial grooves.

7. The system of claim 6, wherein said lock means are lock nuts and including means to rotate said lock nuts into and out of engagement with said teeth.

8. The system of claim 7, wherein the lock nuts are mounted on the clamp piston.

9. The system of claim 8, including means to retain the lock nuts on the clamp piston.

10. The system of claim 9, including means to retain the clamp piston on the clamp block.

11. The system of claim 1, including a single column.

12. The system of claim 11, including a plurality of circumferentially spaced teeth on the clamp piston which engage teeth on said column.

13. The system of claim 12, wherein said clamp piston is housed in a clamp block and said column passes through a corresponding hole in said clamp piston.

14. The system according to claim 13, wherein said column includes at least one axial groove circumferentially spaced between the teeth.

15. The system according to claim 14, including means to rotate the clamp piston to engage and disengage the clamp piston teeth and the column teeth.

16. The system according to claim 1, wherein said column is spaced from said tiebars.

* * * * *